United States Patent
Krüger et al.

(10) Patent No.: US 12,129,106 B2
(45) Date of Patent: Oct. 29, 2024

(54) SINGLE-SERVE CAPSULE FOR PREPARING A BEVERAGE IN A BEVERAGE PREPARATION MACHINE, AND SYSTEM FOR PREPARING A BEVERAGE FROM SAID SINGLE-SERVE CAPSULE

(71) Applicant: GCS GERMAN CAPSULE SOLUTION GMBH, Bergisch Gladbach (DE)

(72) Inventors: Marc Krüger, Bergisch Gladbach (DE); Günter Empl, Bergisch Gladbach (DE)

(73) Assignee: GCS GERMAN CAPSULE SOLUTION GMBH, Bergisch Gladbach (DE)

( * ) Notice: Subject to any disclaimer, the term of this patent is extended or adjusted under 35 U.S.C. 154(b) by 621 days.

(21) Appl. No.: 17/428,470

(22) PCT Filed: Feb. 13, 2020

(86) PCT No.: PCT/EP2020/053677
§ 371 (c)(1),
(2) Date: Aug. 4, 2021

(87) PCT Pub. No.: WO2020/165302
PCT Pub. Date: Aug. 20, 2020

(65) Prior Publication Data
US 2022/0097954 A1 Mar. 31, 2022

(30) Foreign Application Priority Data
Feb. 13, 2019 (DE) .......................... 102019201904.8
May 23, 2019 (DE) .......................... 102019207557.6

(51) Int. Cl.
*B65D 85/804* (2006.01)
*A47J 31/36* (2006.01)
*A47J 31/40* (2006.01)

(52) U.S. Cl.
CPC ...... *B65D 85/8064* (2020.05); *A47J 31/3623* (2013.01); *A47J 31/407* (2013.01)

(58) Field of Classification Search
CPC ............ B65D 85/8043; B65D 85/8046; B65D 85/8064; A47J 31/0668; A47J 31/3623;
(Continued)

(56) References Cited

U.S. PATENT DOCUMENTS

| 2011/0041702 A1 | 2/2011 | Yoakim |
| 2015/0201792 A1 | 7/2015 | Doglioni |

(Continued)

FOREIGN PATENT DOCUMENTS

| EP | 1654966 A1 | 5/2004 |
| EP | 1839543 A1 | 10/2007 |

(Continued)

OTHER PUBLICATIONS

International Search Report and Written Opinion for International Application PCT/EP2020/053677, dated May 26, 2020.

(Continued)

*Primary Examiner* — Hung D Nguyen
(74) *Attorney, Agent, or Firm* — The Dobrusin Law Firm, P.C.

(57) ABSTRACT

A portion capsule for preparing a beverage in a beverage preparation machine, the portion capsule including a base element with a cavity for receiving a beverage raw material, and a capsule cover sealing the cavity; the base element including a capsule base, a peripheral flange with a peripheral bulge, and a capsule wall extending between the capsule base and the peripheral flange; the capsule cover attached to (Continued)

the flange along a sealing plane; a sealing element in the form of a sealing bead pointing away from the capsule cover on the flange; the sealing plane extending along the flange on the side of the capsule cover, between the bulge and the sealing bead; and the sealing bead including an inner flank on the capsule wall side and an outer flank on the bulge side, both oriented at an angle of 80 to 90 degrees to the sealing plane.

25 Claims, 3 Drawing Sheets

(58) Field of Classification Search
CPC .. A47J 31/3628; A47J 31/369; A47J 31/3695; A47J 31/407
See application file for complete search history.

(56) References Cited

U.S. PATENT DOCUMENTS

| | | | |
|---|---|---|---|
| 2016/0159563 A1* | 6/2016 | Bartoli | B65B 51/10 53/511 |
| 2017/0247179 A1 | 8/2017 | Rubinstein | |
| 2018/0148251 A1 | 5/2018 | Kay | |
| 2018/0290824 A1 | 10/2018 | Dijkstra et al. | |
| 2020/0047987 A1* | 2/2020 | Kamerbeek | B65D 85/8043 |

FOREIGN PATENT DOCUMENTS

| | | |
|---|---|---|
| EP | 2872421 A2 | 5/2015 |
| JP | 2016-532484 A | 10/2016 |
| JP | 2018-519014 A | 7/2018 |
| JP | 2018-519014 A5 | 7/2018 |
| WO | 2014/184653 A1 | 11/2014 |
| WO | 2016/041596 A1 | 3/2016 |
| WO | 2016/075319 A1 | 5/2016 |
| WO | 2016/186488 A1 | 11/2016 |
| WO | 2016/186491 A1 | 11/2016 |
| WO | 2018/067009 A1 | 4/2018 |
| WO | 2018/185058 A1 | 10/2018 |
| WO | 2019/149875 A2 | 8/2019 |

OTHER PUBLICATIONS

International Search Report and Written Opinion for International Application PCT/EP2020/053678, dated May 26, 2020.
Japanese Office Action dated Aug. 8, 2023, for Japanese Application 2021-543481.
Japanese Office Action dated Aug. 1, 2023, for Japanese Application 2021-543483.
English Translation of Chinese First Office Action, dated Jul. 7, 2022, for Chinese Application No. 202080013814.2.
Non-Final Office Action, dated Jun. 12, 2024, for U.S. Appl. No. 17/428,836.

* cited by examiner

SINGLE-SERVE CAPSULE FOR PREPARING A BEVERAGE IN A BEVERAGE PREPARATION MACHINE, AND SYSTEM FOR PREPARING A BEVERAGE FROM SAID SINGLE-SERVE CAPSULE

PRIOR ART

The present invention proceeds from a portion capsule (1) for preparing a beverage in a beverage preparation machine, wherein the portion capsule (1) has a base element (2) with a cavity (3) for receiving a beverage raw material and has a capsule lid (4) which closes the cavity (3), wherein the base element (2) comprises a capsule base, an encircling flange and a capsule wall which extends between the capsule base and the encircling flange, wherein the capsule lid (4) is attached to a sealing surface on the flange (7), wherein the flange has an encircling bead at its outer free end, wherein a sealing element in the form of a sealing embossment which points away from the capsule lid is provided on the flange (7), wherein a sealing plane, on which the capsule lid is fixedly sealed, extends on the flange on the side of the capsule lid between the bead and the sealing embossment, and wherein the sealing embossment comprises an inner flank at the side of the capsule wall and an outer flank at the side of the bead.

Such portion capsules are known from the prior art. For example, the document WO 2016/186 488 A1 discloses such a generic portion capsule known. This portion capsule is provided for being inserted into a brewing chamber, in which the capsule base is perforated in order to introduce brewing liquid in the form of hot water under pressure into the cavity. This increases the pressure within the portion capsule, whereby the capsule lid is pressed against a relief or pyramid plate in the brewing chamber and is perforated at the contact points when a predetermined pressure is reached. The beverage produced as a result of interaction between the introduced water and the beverage raw material, in particular roast and ground coffee, then exits the capsule through these perforation points in the lid foil.

All such portion capsules have in common the fact that a sufficient seal between the brewing chamber and the portion capsule in the region of the capsule flange is necessary in order that the water within the brewing chamber flows through the bed of beverage raw material to form the beverage and does not flow outside the portion capsule, that is to say between a wall of the brewing chamber and the outer side of the capsule wall, past the beverage raw material. For this purpose, these types of portion capsules have, in the region of their flange, a sealing element which seals against a brewing chamber element in the brewing chamber. It is desirable here that the sealing element is composed of the same material as the capsule body (also referred to as base element) in order to keep the manufacturing costs for the portion capsule low and to facilitate the disposal or recycling of portion capsules that have already been used.

In FIG. 4H of the document WO 2016/186 488 A1, a stamped sealing embossment is disclosed as a sealing element in the flange region of the portion capsule, which sealing embossment has a vertical outer flank and an inclined inner flank. The aim of said application is that of improving the sealing action. The core concept here is that of using a sealing embossment which is as easily deformable as possible and which, as the brewing chamber is closed, is plastically deformed under the pressure of the brewing chamber element and thus abuts closely against the contour of the brewing chamber element in order to improve the sealing action. In order to facilitate this deformation, the inner flank should have an angle of 20 to 60 degrees and preferably of 30 to 50 degrees with respect to the flange plane. The inner flank thus runs in relatively flat form in order to ensure easy deformability.

A similar portion capsule is known from the document WO 2016/041 596 A1. Here, too, the portion capsule has a stamped sealing embossment in its flange. Here, too, it is the intention for the sealing action between the sealing embossment and the brewing chamber element to be attained by way of a simple deformation of the sealing embossment, for which reason the inner flank of the sealing embossment should in turn have as shallow an angle as possible, which is particularly preferably less than 50 degrees with respect to the flange plane.

A person skilled in the art is familiar with a further portion capsule with an encircling sealing element from the document EP 2 872 421 A1. In this solution, it is the intention for both flanks of the sealing element to has an angle, wherein the inner flank should again have as shallow an angle as possible of between 40 and 80 degrees with respect to the flange plane. It is even explicitly disclosed that, proceeding from an angle of 80 degrees, the flank would become "too vertical" to still be able to achieve a seal between the brewing chamber element and the flange, because this sealing element is also based on the fact that it is deformed (by 20 to 30%) by the brewing chamber element.

The aforementioned portion capsules all have in common the fact that the sealing action of their sealing elements is in each case based on an intense deformation of said sealing elements. For this purpose, inner flanks with as shallow an angle as possible are used in order that, as the brewing chamber is closed, the brewing chamber element can act on the flank and thus leads to a slight deformation of the sealing element.

A disadvantage of a sealing solution based on a deformation of the sealing element is that significantly increased forces are thereby required to close the brewing chamber. The ease of use and the longevity of the beverage preparation machine are thus considerably increased.

Furthermore, the sealing elements known from the prior art are of asymmetrical design. During a deformation, said sealing elements therefore tilt away to the side. Although an increased sealing action is achieved in this way, the lateral tilting of the sealing elements generally gives rise to the problem that the brewing chamber element is clamped by the sealing element such that, after the brewing process, the portion capsule can no longer be separated from the brewing chamber element without an increased expenditure of force. The ejection of the used portion capsule from the brewing chamber is thus made considerably more difficult, and significantly impairs the ease of use.

An alternative would be separate sealing elements composed of a sealing material, such as are known from the documents EP 1 654 966 A1 and EP 1 839 543 A1. However, such sealing elements have the disadvantage already mentioned above that, owing to the use of separate materials, both the manufacturing costs for the portion capsules are significantly higher and the disposal or recycling of portion capsules that have already been used is more difficult because the different materials have to be separated from one another.

DISCLOSURE OF THE INVENTION

It is an object of the present invention to provide a portion capsule of the type mentioned in the introduction which does not have the problems outlined in conjunction with the prior art. In particular, it is the intention to provide a portion capsule which allows an improved sealing action between the flange and the brewing chamber element, without the need for increased forces as the brewing chamber is closed or as the brewed portion capsule is removed or for separate materials to realize the sealing action.

The object of the present invention is achieved by means of a portion capsule for preparing a beverage in a brewing chamber of a beverage preparation machine, wherein the portion capsule has a base element with a cavity for receiving a beverage raw material and has a capsule lid which closes the cavity, wherein the base element comprises a capsule base, an encircling flange and a capsule wall which extends between the capsule base and the encircling flange, wherein the capsule lid is attached to a sealing plane on the flange, wherein the flange has an encircling bead at its outer free end, wherein a sealing element in the form of a sealing embossment pointing away from the capsule lid is provided on the flange, wherein the sealing plane extends on the flange on the side of the capsule lid between the bead and the sealing embossment, wherein the sealing embossment comprises an inner flank at the side of the capsule wall and an outer flank at the side of the bead, wherein both the outer flank and the inner flank are oriented at an angle of greater than 80 to less than 90 degrees with respect to the sealing plane.

The portion capsule according to the invention has the advantage over the prior art that the angle of the inner flank lies between 80 and 90 degrees. The angle is thus significantly steeper than in the case of the angles known from the prior art. This has the effect that the sealing embossment is deformed less as the brewing chamber is closed and as the portion capsule is brewed, and, in particular, the sealing embossment is rigid enough to effect the desired sealing action by way of intense contact between the inner flank and the brewing chamber element. For a person skilled in the art, it was surprising and not to be expected that a departure from the sealing elements well-known from the prior art, all of which are based on the slightest possible deformation of the sealing element, to a sealing embossment that deforms less, and in particular is more rigid, owing to its steep flanks, achieves the desired result of high leak-tightness. Furthermore, this solution does not require high closing forces, because no deformation has to be effected. Furthermore, the sealing embossment according to the invention is of symmetrical design because the inner flank and the outer flank enclose the same angle with the sealing plane, such that extreme lateral tilting of the sealing embossment is prevented. It can be ensured in this way that, even despite a possible certain degree of deformation of the sealing element, the portion capsule can be removed from the brewing chamber again easily and without increased expenditure of force. The inner flank and the outer flank each have in particular an angle of 81 to 89 degrees, preferably 83 to 87 degrees, particularly preferably of 84 to 86 degrees and very particularly preferably of substantially 85 degrees with respect to the sealing plane. It has been found that, in this angle range, on the one hand, the deformation of the sealing embossment can be reduced and the rigidity of the sealing embossment can be increased, because the angle is as steep as possible and the sealing embossment thus ensures high stability with respect to forces acting on the sealing embossment perpendicular to the sealing plane (also referred to as vertical direction Y) and, on the other hand, simple and inexpensive production of the portion capsule is made possible because the angle is always smaller than a right angle. In the case of a right angle at both flanks of the sealing embossment, the inner flank and the outer flank, the demolding of the portion capsule from the molding or stamping tool during the production of the portion capsule would be significantly more difficult.

Advantageous configurations and refinements of the invention can be found in the subclaims and in the following description with reference to the drawings. These advantageous configurations and refinements thus relate equally to both portion capsules according to the invention described above.

According to a preferred embodiment of the present invention, it is provided that the sealing embossment is designed such that, as the brewing chamber is closed, said sealing embossment is deformed only by a maximum of 30%, preferably by a maximum of 20%, particularly preferably by a maximum of 10% and very particularly preferably by a maximum of 5% of its total height perpendicular to the sealing plane.

In particular, the sealing embossment is designed such that, in the event of an exertion of force of up to 100 N on the sealing embossment perpendicular to the sealing plane, said sealing embossment is deformed only by a maximum of 30%, preferably by a maximum of 20%, particularly preferably by a maximum of 10% and very particularly preferably by a maximum of 5% of its height perpendicular to the sealing plane.

According to a preferred embodiment of the present invention, it is provided that the sealing embossment is designed such that, as the brewing chamber is closed, said sealing embossment is deformed parallel to the sealing plane only to such an extent that its radius in relation to a central longitudinal axis (about which the flange is arranged so as to be rotationally symmetrical) of the portion capsule is displaced only by a maximum of 10%, preferably by a maximum of 8%, particularly preferably by a maximum of 5% and very particularly preferably by a maximum of 4%, parallel to the sealing plane. In this way, clamping of the brewing chamber element by the laterally tilting sealing embossment is advantageously prevented, such that the brewed portion capsule can always be removed from the brewing chamber again easily and without increased expenditure of force.

In the case of the present invention, the sealing embossment is thus of such rigid and stable form that, in the event of an exertion of force of in particular up to 100 N centrally on the sealing embossment perpendicular to the sealing plane, that is to say along the vertical direction, which force in particular acts in a planar manner on the tip of the sealing embossment or on a flank region of the sealing embossment or on a planar transition plane of the sealing embossment, a reduced deformation of the sealing embossment occurs. Here, the height of the sealing embossment should be able to be changed in particular by a maximum of 30%, preferably by a maximum of 20%, particularly preferably by a maximum of 10% and very particularly preferably by a maximum of 5%. It is furthermore conceivable that only a reduced lateral displacement or deformation occurs along a direction parallel to the sealing plane, that is to say in the radial direction R as viewed from the central longitudinal axis of the concentrically formed portion capsule. Here, too, it is provided that the tip of the sealing embossment, that is to say the transition region of the sealing embossment, is displaced or deformed by a maximum of 10%, preferably by a maximum of 8%, particularly preferably by a maximum of 5% and very particularly preferably by a maximum of 4%, of its total radius proceeding from the central longitudinal axis of the portion capsule. For example, the total radius can be regarded here as the radius proceeding from the middle of the sealing embossment.

It is preferably provided that the angle between the inner and outer flank is preferably 5 to 15 degrees, particularly preferably 8 to 12 degrees and very particularly preferably substantially 10 degrees.

According to a preferred embodiment of the present invention, it is provided that a transition region extends between the inner flank and the outer flank, wherein, preferably, the transition region is of curved form or has a transition plane which extends parallel to the sealing plane. The curved form of the transition region has the advantage that the sealing embossment gains stability, and thus a deformation can be prevented even more effectively. On the other hand, the planar form of the transition region has the advantage that the sealing embossment is flatter and thus engages to a lesser extent into the depression of the sealing contour of the receiving element of the brewing chamber, such that less force is exerted on the sealing embossment as the brewing chamber is closed. Furthermore, the risk of the clamping of the brewing chamber part is lower in the case of the flat sealing embossment.

It is preferably the case that, in the radial cross section of the encircling sealing embossment, both the inner flank and the outer flank each has a rectilinear contact region which extends between the flange and the transition region. The term "in radial cross section" means that a view is directed to a sectional illustration of the flange contour along the circumferential direction of the encircling flange contour. The plane of the sectional illustration is accordingly spanned by the vertical direction and the radial direction, as illustrated in FIGS. 3 to 5.

According to a preferred embodiment of the present invention, it is provided that the rectilinear contact region has a length of 0.1 to 1.5 millimeters, preferably of 0.3 to 1.3 millimeters, particularly preferably of 0.5 to 1.0 millimeters and very particularly preferably of 0.7 to 0.9 millimeters.

It has been found in simulations and experiments that an optimal seal between the sealing contour of the brewing chamber element and the flange can be achieved with a rectilinear contact region of the stated lengths. In other words: Positively locking and non-positively locking planar abutment of the inner flank against a sealing lug flank of the sealing contour of the brewing chamber element over a length of 0.1 to 1.5 millimeters, preferably 0.3 to 1.3 millimeters, particularly preferably 0.5 to 1.0 millimeters and very particularly preferably of 0.7 to 0.9 millimeters, is sufficient to achieve a sufficient sealing action (in the region of the inner flank) without the need for a intense deformation of the sealing embossment by the sealing contour.

According to a preferred embodiment of the present invention, it is provided that the portion capsule has a radius of 0.05 to 0.2 millimeters, preferably of 0.09 to 0.13 millimeters and particularly preferably of 0.11 in the transition from the rectilinear contact region to the transition region on the side facing toward the capsule lid 4. According to a preferred embodiment of the present invention, it is provided that the portion capsule has a radius of 0.05 to 0.2 millimeters, preferably of 0.09 to 0.13 millimeters and particularly preferably of 0.11 in the transition from the outer flank to the transition region on the side facing toward the capsule lid. According to a preferred embodiment of the present invention, it is provided that the height of the sealing embossment perpendicular to the sealing plane ranges between 0.6 and 1.3 millimeter, preferably between 0.3 and 0.6 millimeters and particularly preferably between 0.9 and 1.0 millimeters. The preferred dimensioning of the sealing embossment described above has the effect that the sealing embossment has sufficient stability in order that intense deformation thereof does not occur as the brewing chamber is closed and/or as the capsule is brewed in the brewing chamber.

According to a preferred embodiment of the present invention, it is provided that the sealing embossment has an average material thickness between 0.05 and 0.3 millimeters, preferably between 0.08 and 1.8 millimeters, particularly preferably between 0.09 and 1.5 millimeters and very particularly preferably of substantially 0.11 millimeters. According to a preferred embodiment of the present invention, it is provided that, in the radial cross section of the encircling sealing embossment, the transition region has a rectilinear connecting region which has a width of between 0.1 and 0.4 millimeters, preferably between 0.15 to 0.35 millimeters and particularly preferably between 0.2 and 0.3 millimeters. According to a preferred embodiment of the present invention, it is provided that the portion capsule has a radius of 0.1 to 0.3 millimeters, preferably of 0.18 to 0.24 millimeters and particularly preferably of 0.20 to 0.22 in the transition from the outer flank to the flange region running parallel to the sealing plane. The preferred dimensioning of the sealing embossment described above has the effect that the sealing embossment has sufficient stability in order that no deformation thereof occurs as the brewing chamber is closed and/or as the capsule is brewed in the brewing chamber.

According to a preferred embodiment of the present invention, it is provided that the portion capsule has a flange region, which extends parallel to the sealing plane, between the bead and the outer flank, and wherein the portion capsule has a flange intermediate region which extends between the inner flank and the capsule wall, wherein the flange region and the flange intermediate region are situated at the same height along a vertical direction perpendicular to the sealing plane. This has the advantage that, as the brewing chamber is closed, no indirect displacement or deformation of the sealing embossment occurs by virtue of the flange intermediate region or the flange region being deformed or displaced relative to one another in the vertical direction.

Instead, both the flange intermediate region and the flange region can be supported on the closure element of the brewing chamber and thus build up a suitable counterforce to prevent significant deformation of the sealing embossment. It is conceivable that the lid foil is sealed or adhesively bonded on the flange in each case both in the flange intermediate region and in the flange region.

According to a preferred embodiment of the present invention, it is provided that the portion capsule has a radius of 0.2 to 0.35 millimeters, preferably of 0.26 to 0.30 millimeters and particularly preferably of substantially 0.28 in the transition from the inner flank to a flange intermediate region which extends between the sealing embossment and the capsule wall.

According to a preferred embodiment of the present invention, it is provided that, in the radial cross section of the sealing embossment, the outer flank has a rectilinear flank section which comprises a length between 0.01 and 0.15 millimeters, preferably between 0.06 and 0.10 millimeters and particularly preferably 0.08 millimeters. According to a preferred embodiment of the present invention, it is provided that, in the radial cross section, the extent of the sealing plane between the outer flank and the bead comprises a length between 0.2 and 0.8 millimeters, preferably between 0.3 and 0.7 millimeters and particularly preferably between 0.4 and 0.6 millimeters.

According to a preferred embodiment of the present invention, it is provided that the bead protrudes over the flange over a top side which forms the sealing plane. The bead preferably protrudes from the flange over a bottom side which faces away from the sealing plane, wherein the bead, on the bottom side, projects from the flange to a lesser extent than the sealing embossment, and/or wherein the bead protrudes over the flange to a lesser extent on the top side than on the bottom side. The bead is formed in particular by rolling-up of the flange edge, wherein the flange edge is preferably rolled up in the direction of the capsule base.

According to a preferred embodiment of the present invention, it is provided that the base element is manufactured in one piece from aluminum. The base element is preferably produced by cold or hot forming, in particular deep drawing, in the case of which the sealing embossment is integrally stamped into the flange. The portion capsule is preferably of frustoconical or cylindrical form. The cavity formed by the base element serves for receiving beverage raw material, for example roasted coffee granules, instant coffee, chocolate powder, tea cuttings, milk powder and/or the like.

The portion capsule preferably has, on its capsule wall, one or more, preferably 6, concentrically encircling grooves for stiffening the capsule wall. The grooves may in this case be formed as inwardly or outwardly facing depressions and/or elevations.

A further subject matter of the present invention is a system for preparing a beverage, having a beverage preparation machine and the portion capsule according to the invention, wherein the beverage preparation machine has a brewing unit with a first brewing chamber part and a second brewing chamber part, wherein the first and/or the second brewing chamber part is movable relative to the other brewing chamber part between an approximated position, in which the first and the second brewing chamber part form a closed brewing chamber, and an open position, in which the first and the second brewing chamber part are spaced apart for the insertion or ejection of a portion capsule, wherein the first brewing chamber part comprises a receiving element for partially receiving the portion capsule and the second brewing chamber part comprises a closure element for the receiving element, wherein, in the closed position, the flange of the portion capsule is received in positively locking and sealing fashion between an edge region of the receiving element and the closure element.

The portion capsule according to the invention is part of the system according to the invention, for which reason all of the advantages and refinements discussed in conjunction with the portion capsule also apply equally to the system according to the invention.

According to a preferred embodiment of the present invention, it is provided that, in the edge region, there is formed a sealing contour for sealing engagement with the sealing embossment, wherein the sealing contour comprises an encircling depression and an encircling sealing lug formed adjacent to the depression, wherein the depression is preferably arranged outside the sealing lug in a radial direction, and wherein an outer sealing lug flank forms an inner wall of the depression. In particular, in the closed position, the sealing lug engages into the flange intermediate region and the sealing embossment engages into the depression such that the sealing lug flank together with the inner flank form linear contact in radial cross section.

According to a preferred embodiment of the present invention, it is provided that, in the closed position, the sealing embossment is deformed by the sealing contour only by a maximum of 30%, preferably by a maximum of 20%, particularly preferably by a maximum of 10% and very particularly preferably by a maximum of 5% of its height perpendicular to the sealing plane.

According to a preferred embodiment of the present invention, it is provided that the sealing contour has a further encircling sealing lug, wherein the depression is arranged between the sealing lug and the further sealing lug in the radial direction, wherein the sealing lug is formed so as to be longer than the further sealing lug, and wherein, in the closed position, the further sealing lug forms punctiform contact with the outer flank in radial cross section.

Further details, features and advantages of the invention will emerge from the drawings and from the following description of preferred embodiments with reference to the drawings. Here, the drawings merely illustrate exemplary embodiments of the invention, which do not restrict the essential inventive concept.

EMBODIMENTS OF THE INVENTION

Figure 1:
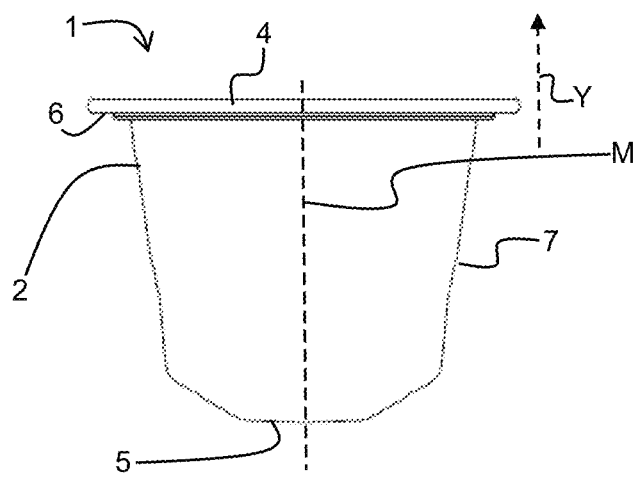
FIGS. 1 and 2 show schematic sectional views of a portion capsule and of a system for preparing a beverage according to an exemplary first embodiment of the present invention.
Figure 2:
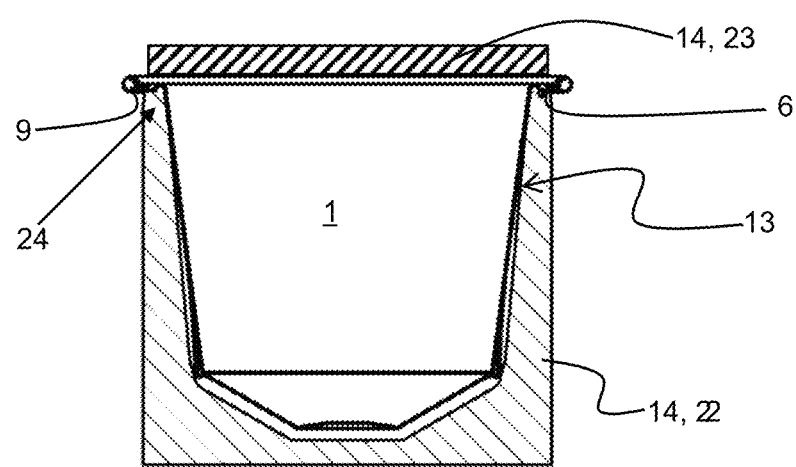

FIGS. 1 and 2 illustrate a schematic side view of a portion capsule 1 and a sectional view of a system composed of the portion capsule 1 and of a part of a beverage preparation machine 14 for preparing a beverage according to an exemplary first embodiment of the present invention.

The portion capsule 1 has a for example cup-shaped and frustoconical base element 2, which has a capsule base 5 at its closed side and an encircling flange 6 at its open side. Between the capsule base 5 and the flange 6, a capsule wall 7 extends around a cavity 3. The portion capsule 1 is of rotationally symmetrical construction about its central longitudinal axis M, which defines a vertical direction Y. In a radial direction R, the flange 6, which is circular and is thus of encircling form in a circumferential direction, protrudes outward beyond the capsule wall 7.

The flange 6 is fixedly connected to a capsule lid 4 in the form of a lid foil which closes the cavity 3 on the open side of the base element 2. For this purpose, the flange 6 has a sealing plane 8 which faces toward the capsule lid 4 and which extends approximately at right angles to the vertical direction Y. The capsule lid 4, in its edge region, is sealed, welded or adhesively bonded to the sealing plane 8.

The capsule lid 4 is preferably formed from aluminum or plastic. Formed within the base element 2 is the cavity 3, which is filled with beverage raw material, for example roasted coffee granules, instant coffee, chocolate powder, tea cuttings, milk powder and/or the like (not illustrated for the sake of clarity), and which is closed by the capsule lid 4.

The cup-shaped configuration of the base element 2 is generated preferably by thermoforming, for example deep drawing by means of negative pressure, positive pressure and/or a movable die. The base element 2 is preferably in the form of a deep-drawn aluminum part. It would alternatively also be conceivable for the plastics part to be formed from polyethylene (PE), polypropylene (PP), polyvinyl chloride (PVC) or polyethylene terephthalate (PET). Alternatively, the portion capsule 1 is produced by means of an injection molding process, in particular in a one-component, multi-component or in-mold process.

During use, the portion capsule 1 is introduced into a brewing unit in a beverage preparation machine 14. The brewing unit comprises a first brewing chamber part and a second brewing chamber part, wherein the first and/or the second brewing chamber part is movable relative to the other brewing chamber part between an approximated position, in which the first and the second brewing chamber part form a closed brewing chamber 13, and an open position, in which the first and the second brewing chamber part are spaced apart for the insertion or ejection of a portion capsule 1.

The first brewing chamber part is in the form of a cup-shaped receiving element 22 which receives the major part of the portion capsule 1, in particular when the brewing chamber 13 is in the closed position. The second brewing chamber part is in the form of a closure element 23 for the receiving element 22. In the closed position shown in FIG. 2, the flange 6 of the portion capsule 1 is clamped sealingly between an edge region 24 of the receiving element 22 and the closure element 23.

In this closed position, the capsule lid 4 and the capsule base 5 are perforated one after the other or at the same time. Here, the one or more perforation openings in the capsule base 5 are formed in particular by one or more perforation tips on the closure element 23 during the closing of the brewing chamber 13, while the perforation openings in the capsule lid 4 are generated preferably by perforation structures in the base of the receiving element already during the closing of the brewing chamber 13 or only as a result of the pressure build-up in the interior of the portion capsule 1 during the beverage preparation process.

Extraction liquid is introduced under pressure into the cavity 3 through the one or more perforation openings in the capsule base 5. The interaction between the extraction liquid and the beverage raw material creates the desired beverage, which exits the portion capsule 1 through the perforation openings in the capsule lid 4 and is fed to a beverage container. By means of an optional filter medium, particles of the beverage raw material can be filtered out of the beverage and retained in the portion capsule 1. Preferably, however, the multiply perforated capsule lid 4 functions as a filter element.

Figure 3:
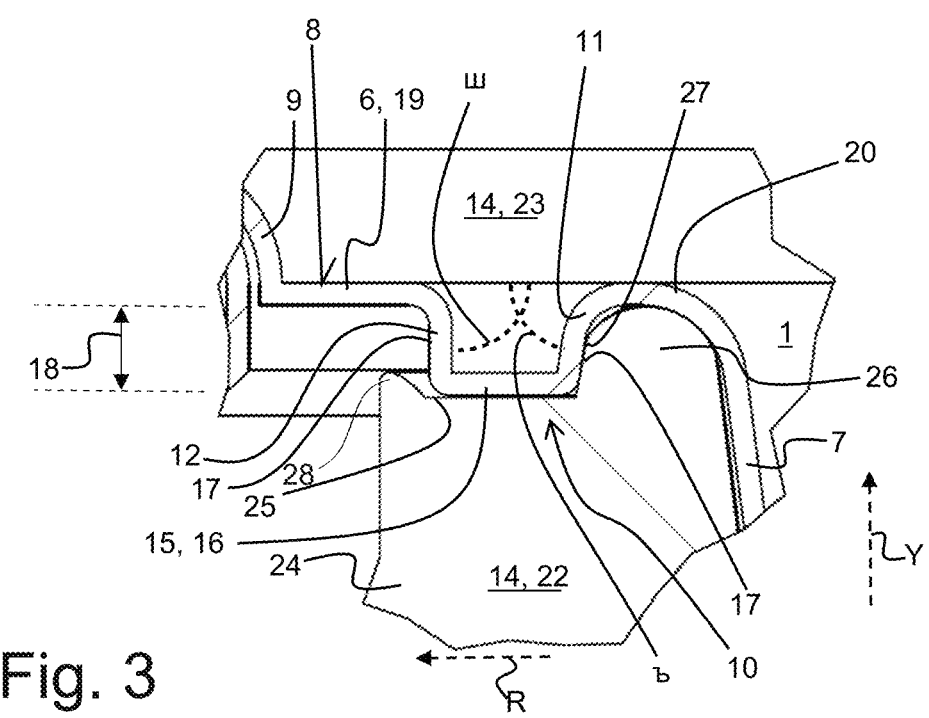
FIGS. 3 and 4 show schematic detail views of the portion capsule according to the exemplary first embodiment of the present invention.
Figure 4:
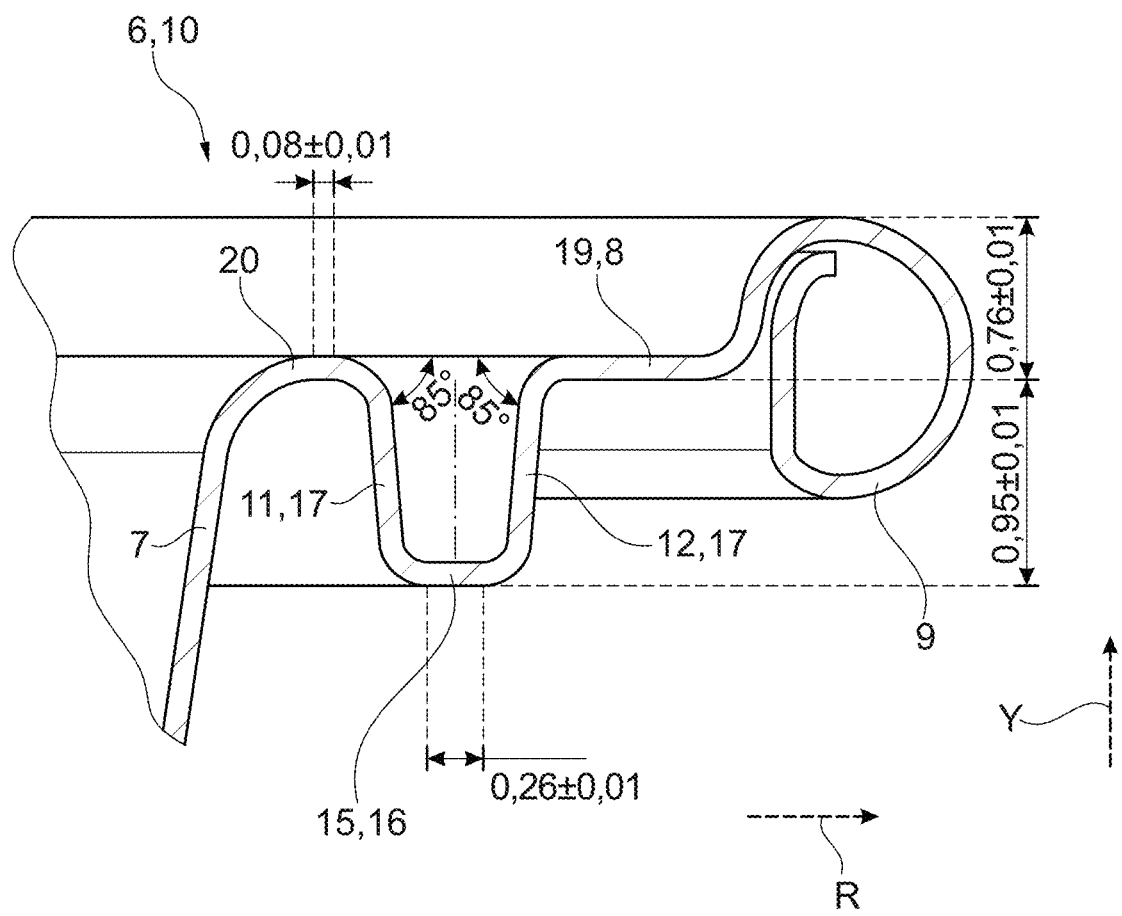

FIGS. 3 and 4 illustrate a detail view of the portion capsule 1 and brewing chamber 13 illustrated in FIG. 2 according to the exemplary first embodiment of the present invention. Here, FIGS. 3 and 4 show the sectional illustration of the flange 6 on the left-hand side of FIG. 2 in an enlarged illustration. FIG. 3 is not true to scale, nor are the angles accurately depicted. It is merely a diagrammatic sketch, from which no angular or length proportions can be gathered.

FIG. 3 is intended merely to illustrate the basic arrangement of the individual regions and the reference designations. FIG. 4 illustrates the region shown in FIG. 3 in a manner more true to scale and with a more accurate depiction of the angular and length proportions. The dimensions and angles of the embodiment shown in FIG. 3 can thus be gathered from FIG. 4.

The flange 6 shown extends substantially horizontally, that is to say parallel to the radial direction R, from the upper end of the capsule wall 7 to its free outer end, at which the flange 6 terminates with a bead 9. The bead 9 comprises, in particular, a flange end rolled up in the direction of the capsule base 5.

Furthermore, the bead 9 protrudes in the vertical direction Y in particular in each case both from the flange 6 over a top side which forms the sealing plane 8 and from the flange 6 over a bottom side which faces away from the sealing plane 8, wherein the flange 6, on the bottom side, projects from the flange 6 to a lesser extent than a sealing embossment 10, and furthermore protrudes over the flange 6 to a lesser or identical extent on the top side in relation to that on the bottom side.

Between the bead 9 and the end of the capsule wall 7, the flange 6 has the sealing embossment 10, which is in the form of a stamped indentation directed in the vertical direction Y away from the capsule lid 4 and which is of concentrically encircling form in the circumferential direction around the central longitudinal axis M. Here, the sealing embossment 10 has an inner flank 11, which faces toward the capsule wall 7, and an outer flank 12, which faces toward the bead 9.

Between the inner flank 11 and the outer flank 12, there extends a planar transition region 15 in the form of the transition plane 16, which runs in particular in a flat (that is to say rectilinear) manner and parallel to the sealing plane 8. Between the outer flank 12 and the bead 9, the flange 6 has a flange region 19, the top side of which forms the sealing plane 8. The outer flank 12 runs at an angle α of approximately 85 degrees with respect to the sealing plane 8 and thus with respect to the plane of the flange region 19.

The outer flank 12 has in particular a rectilinear flank section 21, which preferably comprises a length between 0.5 and 0.9 millimeters. The flange region 19 preferably has a length of 0.2 to 0.8 millimeters. The transition between flange region 19 and outer flank 12 preferably has a radius of 0.20 to 0.21 millimeters on the top side of the flange 6, whereas the transition from the outer flank 12 to the transition plane 16 and to the transition plane 16 to the inner flank 11 on the top side of the flange 6 each have a radius of 0.1 to 0.12.

The flange 6 has a flange intermediate region 20 between the inner flank 11 and the upper end of the capsule wall 7. In the present example, the flange intermediate region is of rectilinear form at least in certain sections in radial cross section. Here, the rectilinear region has in particular a length of 0.07 to 0.09 millimeters.

The inner flank 11 has a rectilinear contact region 17 in radial cross section, that is to say the rectilinear contact region is the length of the straight line between the two turning points in the profile of the inner flank 11. In the present example, the length of the contact region 17 is preferably 0.5 to 0.9 millimeters.

According to the invention, the angle β between the inner flank 11 or the rectilinear contact region 17 and the sealing plane 8 is substantially 85 degrees with respect to the sealing plane 8.

The angle between the inner and outer flank 11,12 is thus preferably 5 to 15 degrees, particularly preferably 8 to 12 degrees and very particularly preferably substantially 10 degrees.

The flange region 19 and the rectilinear section of the flange intermediate region 20 lie at the same height in the vertical direction Y. The height 18 of the sealing embossment 10 corresponds to the total extent of the sealing embossment 10 from the bottom side of the flange and flange intermediate region 19, 20 to the bottom side of the flange 6 in the region of the transition plane 16. This height 18 is, perpendicular to the sealing plane 8, between 0.9 and 1.0 millimeters.

The material thickness of the aluminum in the region of the flange 6 is preferably between 0.1 and 0.13 millimeters.

FIG. 3 likewise illustrates the edge region 24 of the receiving element 22, which is in sealing engagement with the flange 6 of the portion capsule 1. The edge region 24 comprises a sealing contour for sealing engagement with the sealing embossment 10.

For this purpose, the sealing contour has a depression 25, which runs in encircling fashion in the circumferential direction, and a sealing lug 26, which is formed adjacent to the depression 25 and which likewise runs in encircling fashion in the circumferential direction. As viewed in the radial direction R, the depression 25 is arranged outside the sealing lug 26, such that an outer sealing lug flank 27 of the sealing lug 26 forms an inner wall of the depression 25.

In the illustrated closed position, the sealing lug 26 engages into the flange intermediate region 20, whereas the sealing embossment 10 engages into the depression 25. In this way, contact is formed between the sealing lug flank 27 and the inner flank 11 in radial cross section. This contact is preferably present in encircling fashion in the circumferential direction and thus forms the actual seal between flange 6 and receiving element 22, such that no or scarcely any extraction liquid can flow past the beverage substance to the outlet of the brewing chamber 13.

The apex of the sealing lug 26 optionally makes contact with the bottom side of the curvature of the flange intermediate region 20, whereas the bottom side of the transition plane 16 optionally makes contact with the base of the depression 25.

The above-described design and dimensioning of the sealing embossment 10 has the effect that the sealing embossment 10 does not significantly deform as the brewing chamber 14 is closed and/or as the beverage is brewed. The sealing takes place primarily by way of the in particular encircling contact, which is subjected to a relatively intense force owing to the rigidity of the sealing embossment 10.

In other words: The sealing embossment 10 is designed such that, as the brewing chamber 13 is closed and/or as the portion capsule 1 is brewed, said sealing embossment is deformed only by a maximum of 30%, preferably by a maximum of 20%, particularly preferably by a maximum of 10% and very particularly preferably by a maximum of 5% of its height 18 perpendicular to the sealing plane 8. In particular, the sealing embossment 10 is thus designed such that, in the event of an exertion of force of up to 100 N on the sealing embossment 10 perpendicular to the sealing plane 8, said sealing embossment is deformed only by a maximum of 30%, preferably by a maximum of 20%, particularly preferably by a maximum of 10% and very particularly preferably by a maximum of 5% of its height 18 perpendicular to the sealing plane 8. It is only in this way that sufficient force is available for the contact.

It is conceivable that, as the brewing chamber 13 is closed and/or as the portion capsule 1 is brewed, the height 18 of the sealing embossment 10 is changed in the vertical direction Y in particular by a maximum of 0.2 millimeters, preferably by a maximum of 0.15 millimeters, particularly preferably by a maximum of 0.1 millimeters and very particularly preferably by a maximum of 0.05 millimeters.

Preferably, the sealing embossment 10 is thus likewise of such rigid form that that no excessive lateral displacement or deformation in the radial direction R occurs either. It is provided that the sealing embossment 10 is designed such that, as the brewing chamber 13 is closed, said sealing embossment is deformed or displaced parallel to the sealing plane 8 only to such an extent that its radius in relation to a central longitudinal axis of the portion capsule 1 is displaced only by a maximum of 5% parallel to the sealing plane 8, in order that, after the brewing process, the portion capsule 1 can be easily removed from the brewing chamber again and the sealing lug 26 does not become clamped with the laterally tilting sealing embossment 10.

It is conceivable that, in the case of the sealing embossment 10, as the brewing chamber 13 is closed and/or as the portion capsule 1 is brewed, it is preferably provided that the tip of the sealing embossment 10, that is to say the transition region 15 of the sealing embossment 10, is displaced or deformed in a radial direction R by a maximum of 0.2 millimeters, preferably by a maximum of 0.15 millimeters, particularly preferably by a maximum of 0.1 millimeters and very particularly preferably by a maximum of 0.05 millimeters.

The other dimensions numerically depicted in FIG. 4 can preferably likewise be regarded as being essential to the invention.

Figure 5:
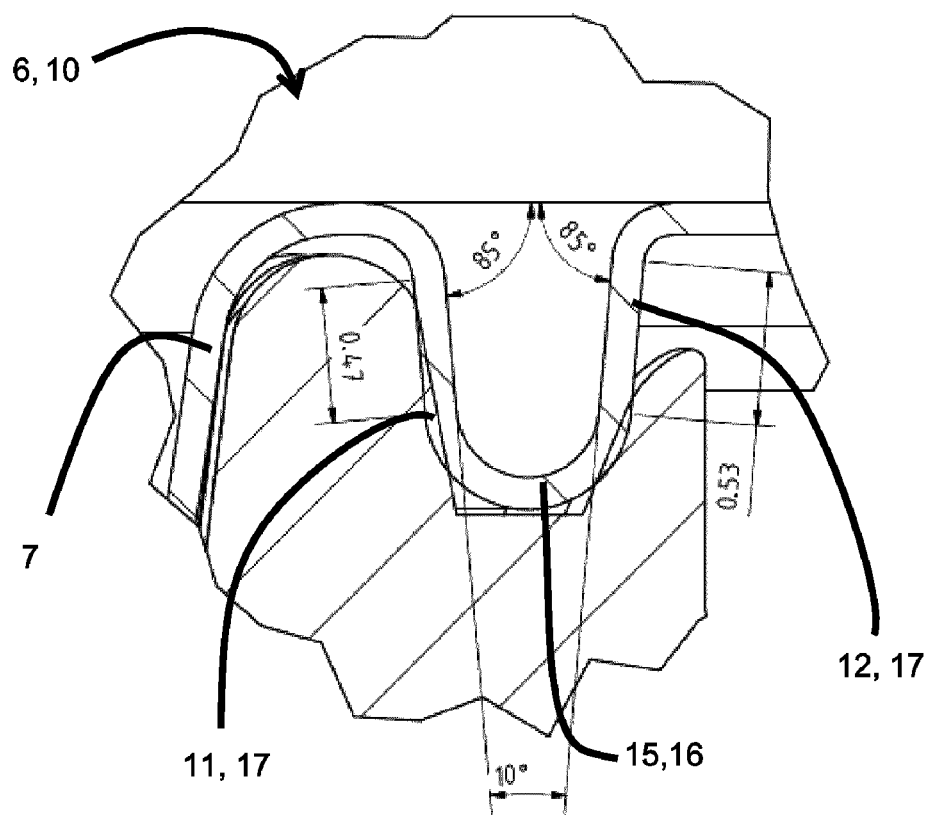
FIG. 5 shows schematic detail views of the portion capsule according to an exemplary first embodiment of the present invention.

FIG. 5 illustrates a detail view of the portion capsule 1 and brewing chamber 13 illustrated in FIGS. 3 and 4 according to an exemplary second embodiment of the present invention. Here, FIG. 5 shows the sectional illustration of the sealing embossment 10 (in the same orientation as in FIG. 4, that is to say the capsule wall 7 on the left-hand side and the bead 9 on the righthand side 7) in an enlarged illustration.

The second embodiment is substantially identical to the first embodiment illustrated in FIGS. 3 and 4, such that all of the above explanations apply analogously.

By contrast, the transition region 15 is however designed as a curved transition region and not as a rectilinear, flattened transition region 15. The rectilinear contact region 17 has, on the outer flank 12, a length of 0.5 to 0.6 mm, in particular of 0.53 mm. The rectilinear contact region 17 has, on the inner outer flank 11, a length of 0.4 to 0.55 mm, in particular 0.473 mm.

The angle between the inner and outer flank 11, 12 is preferably 5 to 15 degrees, particularly preferably 8 to 12 degrees and very particularly preferably substantially 10 degrees.

LIST OF REFERENCE DESIGNATIONS

1 Portion capsule
2 Base element
3 Cavity
4 Capsule lid
Capsule base
6 Flange
7 Capsule wall
8 Sealing plane
9 Bead
Sealing embossment
11 Inner flank
12 Outer flank
13 Brewing chamber
14 Beverage preparation machine
Transition region
16 Transition plane
17 Contact region
18 Height of the sealing embossment
19 Flange region Flange intermediate region
21 Flank section
22 Receiving element
23 Closure element
24 Edge region
Depression
26 Sealing lug
27 Sealing lug flank
28 Further sealing lug
α Angle
β Angle
R Radial direction
Y Vertical direction
M Central longitudinal axis

The invention claimed is:

1. A portion capsule for preparing a beverage in a brewing chamber of a beverage preparation machine, wherein the portion capsule has a base element with a cavity for receiving a beverage raw material and has a capsule lid which closes the cavity, wherein the base element is manufactured in one piece from aluminum and wherein the base element comprises a capsule base, an encircling flange and a capsule wall which extends between the capsule base and the encircling flange, wherein the capsule lid is attached to a sealing plane on the flange, wherein the flange has an encircling bead at its outer free end, wherein a sealing element in a form of a sealing embossment which points away from the capsule lid is provided on the flange, wherein the sealing plane extends on the flange on a side of the capsule lid between the bead and the sealing embossment, wherein the sealing embossment comprises an inner flank at a side of the capsule wall and an outer flank at a side of the bead, wherein both the outer flank and the inner flank are oriented at an angle of 81 to 89 degrees with respect to the sealing plane, wherein a transition region extends between the inner flank and the outer flank, and wherein the transition region has a transition plane which extends parallel to the sealing plane, and wherein the sealing embossment is designed such that, as the brewing chamber is closed, the sealing embossment is deformed only by a maximum of 30% of its height perpendicular to the sealing plane.

2. The portion capsule as claimed in claim 1, wherein both the inner flank and the outer flank have the angle of 83 to 87 degrees.

3. The portion capsule as claimed in claim 1, wherein the sealing embossment is designed such that, as the brewing chamber is closed, said sealing embossment is deformed only by a maximum of 20% of its height perpendicular to the sealing plane.

4. The portion capsule as claimed in claim 1, wherein the sealing embossment is designed such that, in an event of an exertion of force of up to 100 N on the sealing embossment perpendicular to the sealing plane, said sealing embossment is deformed only by a maximum of 30% of its height perpendicular to the sealing plane.

5. The portion capsule as claimed in claim 1, wherein the sealing embossment is designed such that, as the brewing chamber is closed, said sealing embossment is deformed parallel to the sealing plane only to such an extent that its radius in relation to a central longitudinal axis of the portion capsule is displaced only by a maximum of 10% parallel to the sealing plane.

6. The portion capsule as claimed in claim 1, wherein, in a radial cross section of the sealing embossment, the inner flank, and the outer flank each have a rectilinear contact region which extends between the flange and the transition region.

7. The portion capsule as claimed in claim 6, wherein the rectilinear contact region has a length of 0.1 to 1.5 millimeters.

8. The portion capsule as claimed in claim 6, wherein the portion capsule has a radius of 0.05 to 0.2 millimeters in a transition from the rectilinear contact region to the transition region on a side facing toward the capsule lid.

9. The portion capsule as claimed in claim 1, wherein the portion capsule has a radius of 0.05 to 0.2 millimeters in a transition from the outer flank to the transition region on a side facing toward the capsule lid.

10. The portion capsule as claimed in claim 1, wherein a height of the sealing embossment perpendicular to the sealing plane ranges between 0.6 and 1.3 millimeters.

11. The portion capsule as claimed in claim 1, wherein the sealing embossment has an average material thickness between 0.05 and 0.3 millimeters.

12. The portion capsule as claimed in claim 1, wherein, in a radial cross section of the sealing embossment, the transition region has a rectilinear connecting region which has a width of between 0.1 to 0.4 millimeters.

13. The portion capsule as claimed in claim 1, wherein the portion capsule has a radius of 0.1 to 0.3 millimeters in a transition from the outer flank to the flange region running parallel to the sealing plane on a side facing toward the capsule lid.

14. The portion capsule as claimed in claim 1, wherein the portion capsule has a flange region, which extends parallel to the sealing plane, between the bead and the outer flank, and wherein the portion capsule has a flange intermediate region which extends between the inner flank and the capsule wall, wherein the flange region and the flange intermediate region are situated at the same height along a vertical direction perpendicular to the sealing plane.

15. The portion capsule as claimed in claim 1, wherein the portion capsule has a radius of 0.2 to 0.35 millimeters in a transition from the inner flank to a flange intermediate region which extends between the sealing embossment and the capsule wall on a side facing toward the capsule lid.

16. The portion capsule as claimed in claim 15, wherein, in a radial cross section, the flange intermediate region has a rectilinear section which comprises a length between 0.01 and 0.15 millimeters.

17. The portion capsule as claimed in claim 1, wherein, in a radial cross section, an extent of the sealing plane between the outer flank and the bead comprises a length between 0.2 and 0.8 millimeters.

18. The portion capsule as claimed in claim 1, wherein the bead protrudes over the flange over a top side which forms the sealing plane.

19. The portion capsule as claimed in claim 1, wherein the bead protrudes from the flange over a bottom side which faces away from the sealing plane, wherein the flange, on the bottom side, projects from the flange to a lesser extent than the sealing embossment, and/or wherein the bead protrudes over the flange to a lesser extent on the top side than on the bottom side.

20. The portion capsule as claimed in claim 1, wherein the bead is formed by rolling-up of the flange edge, wherein the flange edge is rolled up in a direction of the capsule base.

21. A system for preparing a beverage, having a beverage preparation machine and a portion capsule as claimed in claim 1, wherein the beverage preparation machine has a brewing unit with a first brewing chamber part and a second brewing chamber part, wherein the first brewing chamber part and/or the second brewing chamber part is movable relative to the other brewing chamber part between an approximated position, in which the first brewing chamber part and the second brewing chamber part form a closed brewing chamber, and an open position, in which the first brewing chamber part and the second brewing chamber part are spaced apart for insertion or ejection of a portion capsule, wherein the first brewing chamber part comprises a receiving element for partially receiving the portion capsule and the second brewing chamber part comprises a closure element for the receiving element, wherein, in a closed position, the flange of the portion capsule is received in positively locking and sealing fashion between an edge region of the receiving element and the closure element.

22. The system as claimed in claim 21, wherein, in the edge region, there is formed a sealing contour for sealing engagement with the sealing embossment, wherein the sealing contour comprises an encircling depression and an encircling sealing lug formed adjacent to the depression, wherein the depression is arranged outside the sealing lug in a radial direction, and wherein an outer sealing lug flank forms an inner wall of the depression.

23. The system as claimed in claim 22, wherein, in the closed position, the sealing lug engages into a flange intermediate region and the sealing embossment engages into the depression such that the sealing lug flank together with the inner flank form linear contact in radial cross section.

24. The system as claimed in claim 23, wherein, in the closed position, the sealing embossment is deformed by the sealing contour only by a maximum of 30% of its height perpendicular to the sealing plane.

25. The system as claimed in claim 22, wherein the sealing contour has a further encircling sealing lug, wherein the depression is arranged between the sealing lug and the further sealing lug in the radial direction, wherein the sealing lug is formed so as to be longer than the further sealing lug, and wherein, in the closed position, the further sealing lug forms punctiform contact with the outer flank in radial cross section.

* * * * *